Figure 1:
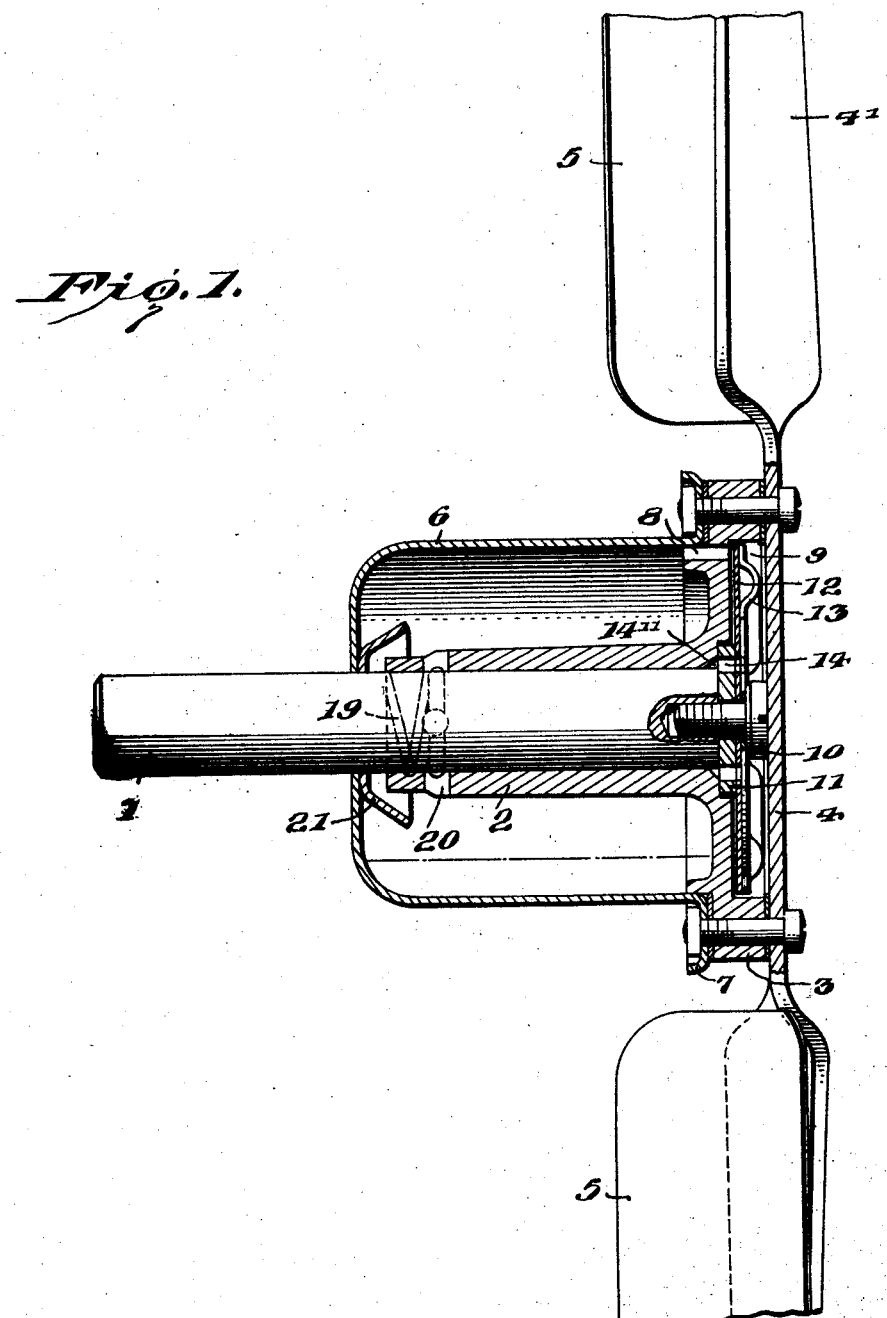

Aug. 26, 1930. F. A. SMITH 1,773,882
SELF LUBRICATING FAN
Filed Dec. 16, 1927 2 Sheets-Sheet 1

INVENTOR.
F. A. Smith
BY Bacon & Thomas
ATTORNEYS

Aug. 26, 1930.  F. A. SMITH  1,773,882
SELF LUBRICATING FAN
Filed Dec. 16, 1927    2 Sheets-Sheet 2
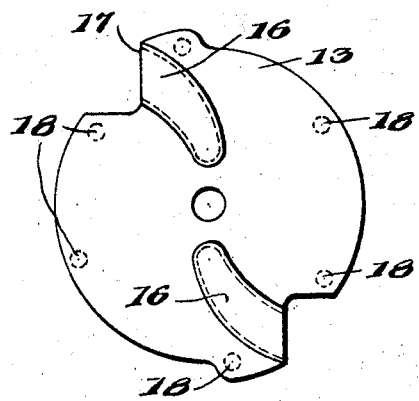
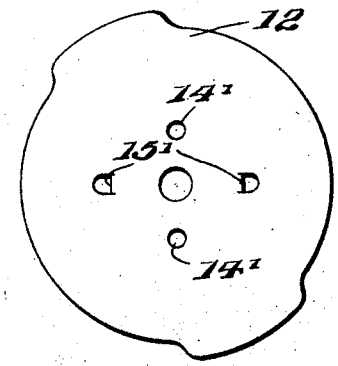
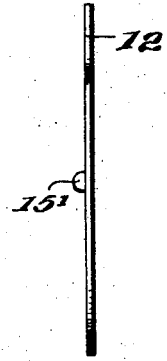
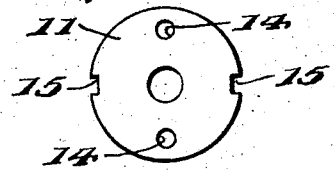
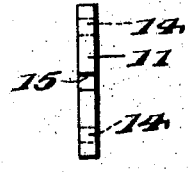
INVENTOR.
F.A.Smith
BY
ATTORNEYS Patented Aug. 26, 1930

1,773,882

UNITED STATES PATENT OFFICE

FREDRICK ARTHUR SMITH, OF INDIANAPOLIS, INDIANA, ASSIGNOR, BY MESNE ASSIGNMENTS, TO HOUDAILLE-HERSHEY CORPORATION, A CORPORATION OF MICHIGAN

SELF-LUBRICATING FAN

Application filed December 16, 1927. Serial No. 240,548.

This invention relates to a novel fan construction of the general type employed in connection with automobile engines and is directed more particularly to the problem of providing dependable automatic lubrication therefor.

The primary object of my invention is to provide a fan structure embodying a lubricant chamber with means for centrifugally feeding lubricant therefrom to the bearing surfaces of the fan.

Other objects relate to features of construction and design conducive to simplicity and cheapness of manufacture. An illustrative embodiment of my invention is found in the accompanying drawings wherein—

Figure 1 is a longitudinal sectional view of a fan constructed in accordance with my invention, Figures 2 and 3 are detailed views of the channeled lubricant conducting plate, Figures 4 and 5 are detailed views of a second plate which cooperates with the channel plate to form closed lubricant passages, and Figures 6 and 7 are detailed views of a thrust washer.

My improved fan construction is rotatably mounted on a fixed or stationary spindle 1.
The body or supporting structure of the fan comprises an elongated sleeve 2 journaled on the spindle and provided at one end with a radially extending flange 3. This flange at its outer end forms a support for any desired type of fan but is particularly adapted to receive a fan spider 4 of a type substantially as herein shown. The central portion of this spider is in the form of a disc or plate which carries radially extending and angularly disposed arms to which the fan blades are secured.

In order to accommodate a constant supply of lubricant I have provided a cylindrical housing 6 closely surrounding the spindle 1 at one end and at its enlarged open end secured to the rear face of the radial flange 3. This casing forms a lubricant reservoir for holding a supply of lubricant and the flange 3 is provided with axially extending apertures 8 through which this lubricant may be fed to the means hereinafter described for lubricating the bearing surfaces of the fan. The outer face of the flange 3 is recessed to provide a second lubricant chamber 9 into which the second lubricant chamber 9 into which the aperture 8 is adapted to conduct lubricant. This recess 9 is closed by the fan spider 4 bolted or otherwise secured to the outer faces of the flange 3. Mounted within this second lubricant chamber 9 is a lubricant collecting and conveying structure which is adapted to receive the lubricant discharged through the aperture 8 and conduct the same radially inward to the bearing surfaces of the sleeve and spindle. This structure comprises a thrust washer 11 which abuts the end of spindle 1 and also sets into a recess formed in the end of the sleeve 2 and abuts the base surface of this recess, thereby acting to receive the longitudinal thrust of the sleeve 2 in one direction. This thrust washer is provided with apertures 14 which register with an annular recess 14'' formed in the end of the sleeve 2 and adjacent the spindle 1. The washer is further provided with recesses 15 in the periphery thereof, which recesses are adapted to receive lugs or ears 15' which are struck out from a plate or disc 12. By means of the slots 15 and lugs or ears 15' the plate 12 is secured against rotation with respect to the thrust washer. A second plate 13 having curved radially extending depressions 16 therein is mounted adjacent the plate 12 and cooperates therewith to form curved radial extending lubricant passages. This plate 13 may be secured to the face of the plate 12 in any desired manner but as herein shown, the two plates are adapted to be united by spot welding at a plurality of points adjacent the peripheries thereof. The passages 16 terminate inwardly at a point in registration with the apertures 14 of the washer and 14' of the disc 12. The thrust washer and plates 12 and 13 are centrally recessed to receive a securing bolt 10 which is adapted to be threaded into the end of the spindle 1. The lubricant conducting assembly is thus secured to the spindle and held against movement relative thereto.

The casing 6 may be provided with a pulley or other driving means as desired and should also be provided with some form of filler plug through which lubricant may be introduced. Suitable packings are preferably employed between the radially extending flange 7 of the casing and the flange 3 of the sleeve, as well as between the fan spider 4 and the flange 3. Spirally arranged oil grooves are provided on the inner surface of the sleeve 2 at the rear end thereof for conveying lubricant forwardly from around the packing 21 and discharging the same outwardly through the radial apertures 20 of the sleeve. This latter feature is provided in order to relieve the lubricant pressure from around the packing 21. It is to be noted that the bolt 10 that secures the lubricant conducting assembly in position is provided with an enlarged flat head adjacent the fan spider 4. This latter arrangement is such as to afford a thrust bearing surface for receiving the longitudinal thrust of the fan structure in one direction, the thrust in the opposite direction being taken by the thrust washer above mentioned.

In operation, the lubricant disposed within the casing 6 is centrifugally discharged through the aperture 8 where it is received by the passages 16 and conducted inwardly and discharged through apertures 14 and 14' to the annular recess 14'' at the meeting surfaces of the sleeve and spindle. This is in effect a force feed lubrication inasmuch as considerable centrifugal force is created by the rotation of the fan, which force is utilized to discharge lubricant to the conducting structure.

The structure described above is of such a character that the component parts thereof may for the most part be formed of sheet metal by simple stamping processes and for this reason the structure offers advantages from the standpoint of economy of manufacture. Moreover, the structure does not embody any added movable parts which might eventually require repair or replacement. While it is apparent that many changes might be made by one skilled in the art, I nevertheless prefer the construction herein illustrated and described but desire that it be understood that I do not intend to limit the invention to the exact details disclosed beyond the extent of the limitations contained in the appended claims.

What I claim is:

1. In a device of the character described, the combination of a fixed spindle, of a sleeve journaled on said spindle and having a radially extending flange secured thereto, said flange having in its outer face a concentrically disposed circular recess, the base of said recess being substantially flush with the end face of said spindle, a thrust washer disposed in said recess and engaging the base thereof and the end face of said spindle whereby to receive the longitudinal thrust of said sleeve and means for securing said thrust washer to said spindle, said means comprising a bolt threaded into the end of said spindle, a fan spider secured to the outer face of said flange adapted to engage the head of said bolt, whereby the longitudinal thrust of said sleeve in the opposite direction is received by said bolt and a lubricant collecting device mounted on said bolt intermediate the head thereof and said thrust washer.

2. In a device of the character described, the combination with a fixed spindle, of a fan structure journaled on said spindle, said fan structure embodying two separate but communicating chambers, one being adapted to contain a lubricant supply and to discharge under centrifugal force into the other, said other chamber being disposed beyond the outer end of said spindle a lubricant conducting means located in said other chamber and adapted to receive lubricant discharged from said supply chamber and conduct it inwardly to the bearing surfaces of said spindle and fan structure, said conducting means comprising a plate having curved radial depressions and a second plate cooperating with the first said plate to define lubricant passages and means for securing said plates together and to the outer end of said spindle.

3. In a device of the character described, the combination with a fixed spindle, of a sleeve journaled on said spindle and having a radially extending flange secured thereto, said flange having in its outer face a concentrically disposed circular recess the base whereof lies substantially flush with the end face of said spindle, a headed bolt threaded in the end of said spindle, a thrust washer mounted on said bolt and adapted to engage the end face of said spindle and the base of said recess, a lubricant collecting and conveying device mounted on said bolt intermediate the head thereof and said thrust washer and interlocking connections between said lubricant collecting and conveying device and said thrust washer.

4. A self lubricating fan substantially as defined in claim 3 and wherein said thrust washer is provided with passages communicating with said lubricant collecting and conveying device and with the coacting bearing surfaces of said sleeve and spindle.

5. A self lubricating fan comprising in combination, a fixed spindle, a sleeve journaled on said spindle and having a radially extending flange secured thereto, said flange having in its outer face a concentrically disposed circular recess the base whereof lies substantially flush with the end face of said spindle, a headed bolt threaded in the end of said spindle, a thrust washer mounted on said bolt and adapted to engage the end face of said spindle and the base of said recess, a lubricant collecting device mounted on said bolt intermediate the head thereof and said thrust washer, said device comprising a disc mounted on said bolt adjacent said thrust washer and having a tongue and slot connection therewith, a second disc mounted on said bolt and secured to the first said disc, said second disc having substantially radially disposed depressions formed therein whereby to form, in conjunction with the first disc, lubricant passages, the said bolt serving to secure the said thrust washer and discs in assembled relation with the end of the spindle.

6. A self lubricating fan substantially as defined in claim 5 and wherein said thrust washer and first mentioned disc are provided with aligned apertures having communication with the passages formed by the two said discs and with the coacting bearing surfaces of the sleeve and spindle.

In testimony whereof I affix my signature.

FREDRICK ARTHUR SMITH.